(12) United States Patent
Tomaini

(10) Patent No.: US 10,125,912 B2
(45) Date of Patent: Nov. 13, 2018

(54) SPACER SYSTEM FOR REFLECTIVE INSULATION

(76) Inventor: John C. Tomaini, Nanuet, NY (US)

( * ) Notice: Subject to any disclaimer, the term of this patent is extended or adjusted under 35 U.S.C. 154(b) by 0 days.

(21) Appl. No.: 13/199,399

(22) Filed: Aug. 27, 2011

(65) Prior Publication Data

US 2013/0048132 A1 Feb. 28, 2013

(51) Int. Cl.
*F16L 59/07* (2006.01)
*F16L 59/02* (2006.01)
*F16L 59/08* (2006.01)
*F24F 13/02* (2006.01)

(52) U.S. Cl.
CPC ............ *F16L 59/026* (2013.01); *F16L 59/07* (2013.01); *F16L 59/08* (2013.01); *F24F 13/0263* (2013.01)

(58) Field of Classification Search
CPC ......... F16L 59/026; F16L 59/07; F16L 59/08; F16L 59/029; F24F 13/0263
USPC .......................... 138/112–115, 141, 148, 149
See application file for complete search history.

(56) References Cited

U.S. PATENT DOCUMENTS

| | | | | | |
|---|---|---|---|---|---|
| 563,775 | A | * | 7/1896 | Lantzke | 428/178 |
| 664,950 | A | * | 1/1901 | Hewlings | 138/111 |
| 1,577,495 | A | * | 3/1926 | Scharwath | 138/116 |
| 1,677,714 | A | * | 7/1928 | Frease | 138/115 |
| 1,913,180 | A | * | 6/1933 | Weber | 138/111 |
| 1,996,435 | A | * | 4/1935 | O'Neil | 138/115 |
| 2,434,465 | A | * | 1/1948 | Marc | 156/325 |
| 3,495,628 | A | * | 2/1970 | Boender | 138/114 |
| 5,005,531 | A | * | 4/1991 | Nelson | 122/19.2 |
| 6,230,750 | B1 | * | 5/2001 | Lessard et al. | 138/149 |
| 6,527,013 | B2 | * | 3/2003 | Somerville et al. | 138/148 |
| 6,716,520 | B2 | * | 4/2004 | Cook, II | 428/314.4 |

* cited by examiner

*Primary Examiner* — Nicholas J Weiss
(74) *Attorney, Agent, or Firm* — Brian L. Wamsley

(57) ABSTRACT

A system for providing more efficient insulation for heating and air conditioning ducts is disclosed. Specifically, a system comprising one or more layers of light-weight, rigid spacers made of non-conductive material attached over an air duct, is disclosed. The spacers contain air channels or air spacers, and can be pre-attached to the air duct prior to installation of the duct. The air duct/spacer combination is wrapped with reflective insulation material.

6 Claims, 5 Drawing Sheets

_US 10,125,912 B2_

SPACER SYSTEM FOR REFLECTIVE INSULATION

This application claims priority from U.S. provisional application No. 61/402,266 filed Aug. 26, 2010.

BACKGROUND OF THE INVENTION

The present invention relates to a system for providing more efficient insulation for heating and air conditioning ducts for a number of uses in the home, apartment buildings or other private or commercial buildings that use HVAC or other similar systems for heating and cooling. In particular, the system according to the present invention provides a more effective and increased R value for reflective insulation that is commonly wrapped around the air conditioning or heating duct.

Reflective insulation, as now used in home and industry to insulate heating and air conditioning ducts, insulates primarily by reflecting radiant energy either to or from the duct. This provides, therefore, an R value based only on the reflective properties of the material. It is well known that air is relatively non-conductive of heat or cold and thus it would be advantageous to provide an air space between the reflective insulation material and the duct to take advantage of the non-conductive insulation properties of air. In addition, it would be beneficial for a system that provides for an air space between the duct and the reflective material to be attached to the duct prior to installation, because of the obvious difficulties encountered when wrapping an air duct when it is already installed. Whatever material employed to create the air space, besides being non-conductive, would best be light-weight and rigid.

Presently, there is no system in use in either private or commercial buildings that provides an air space between the reflective material and the duct that is non-conductive, light in weight, rigid, and is capable of being pre-installed to the duct prior to installing the duct itself. Other known methods of spacing reflective insulation are inadequate and inefficient and do not allow for any support so the air space during installation and the R-value is compromised.

SUMMARY OF THE INVENTION

A principle object of the present invention is to provide a system to improve the R value of reflective material used to wrap heating and air conditioning ducts by providing an air space between the reflective material and the duct. It is also an object of the present invention to provide a system to create an air space between the reflective material and air ducts by utilizing spacer material that is non-conductive and lightweight. It is a further object of this invention to utilize spacer material that can be attached to the duct prior to installation of the duct and is rigid, so that the air space keeps its form and is not compromised or compressed during the installation of the duct.

Thus, according to these objectives, the system of the present invention uses a non-conductive substrate or material that contains air gaps, spaces or compartments. The substrate or material also has a minimum thickness of ⅛" to up to ¾", 1" or even more, as desired, to insure a proper air space or gap between the surface of the air duct and the reflective insulation material used to insulate the air duct, to obtain the correct R value.

Typical R values for reflective insulation is R6 with a 1" air space and R8 for double wrapped insulation with the thinner thicknesses, and R8 with a ¾" air space for the 1" or thicker single-wrapped insulation.

The materials or substrates of this system is formed into strips that can be fastened along the length of the ductwork on all four sides, extending over the duct corners by a minimum of ⅛" and up to ¾", 1" or even more as desired, so that when the reflective insulation is wrapped around the air duct and spacer materials, there will be a minimum of ⅛" air space around the entire duct.

The materials or substrates of this invention will also insure, by their weight bearing properties, that the air space between the duct and the insulation are not compromised when installing the air duct in an attic space or when hung on hangers because this system is continuous down the length of the air duct giving rigidity to the insulation without compromising the R value.

Furthermore, the system of this invention provides for a double layer of the materials or substrates prior to wrapping the reflective insulation for when an even higher R value is needed. That is, the spacer material or substrate can be easily applied a second time over the top of the first layer of spacer material or substrate, and could be mechanically fastened to the first spacer on all four sides overlapping a minimum of ⅛" on the corners to insure a proper air space is maintained, or can even be applied over the first layer of reflective insulation.

DETAILED DESCRIPTION OF THE PREFERRED EMBODIMENTS

Figure 1:
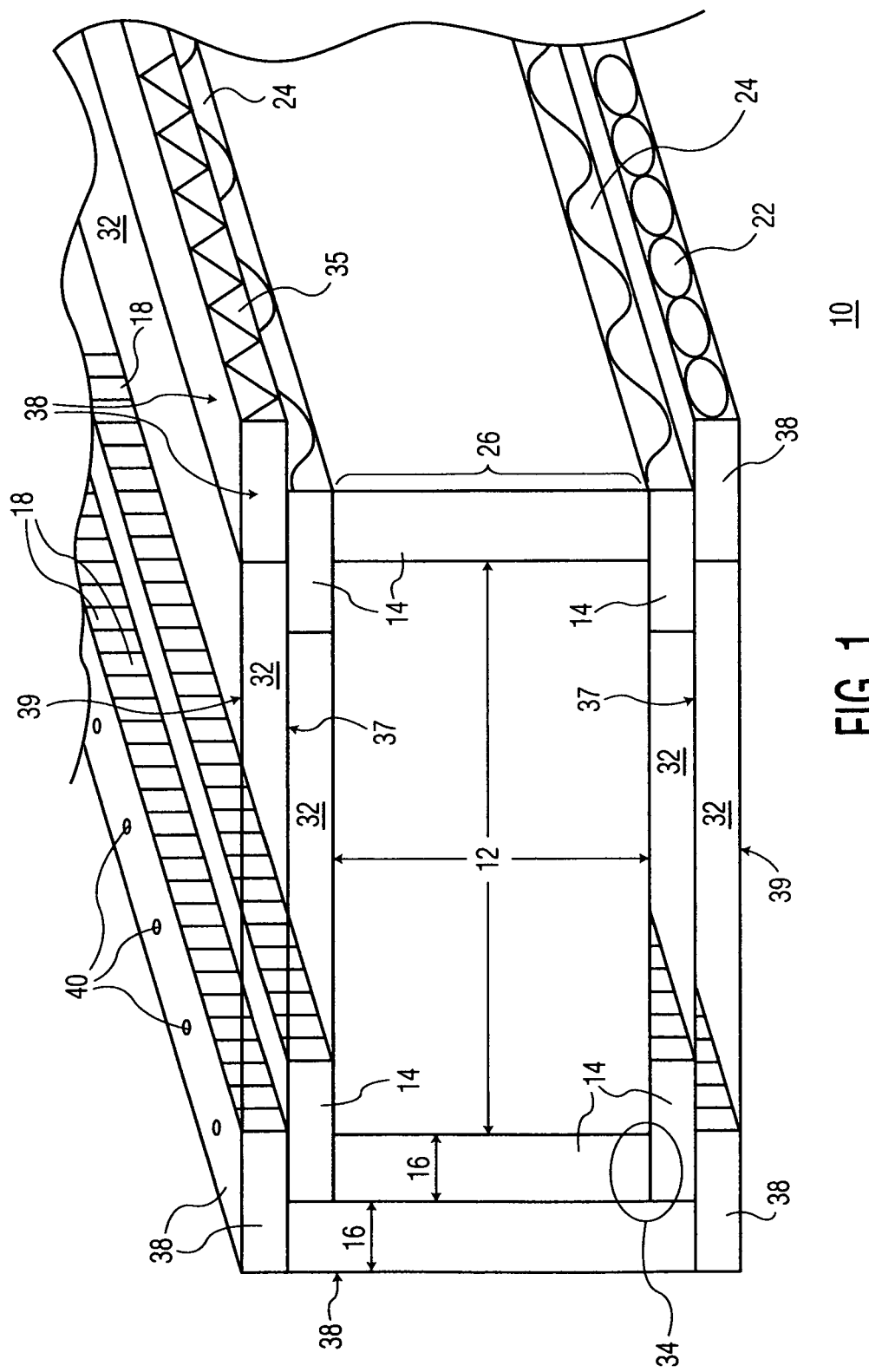
FIG. 1 is a perspective view of a preferred embodiment of this invention.

The preferred embodiments of the present invention will now be described with reference to the FIGS. 1-5 of the drawings. Identical elements in the various figures are designated with the same reference numerals.

FIG. 1 illustrates a preferred embodiment of the system of the present invention, generally designated by the reference number 10. The system comprises a ventilation air duct 12 as commonly used in residences, commercial buildings, and the like, for heating and/or cooling, such as in HVAC systems. Traditionally, the ducts are rectangular or square.

Figure 2:
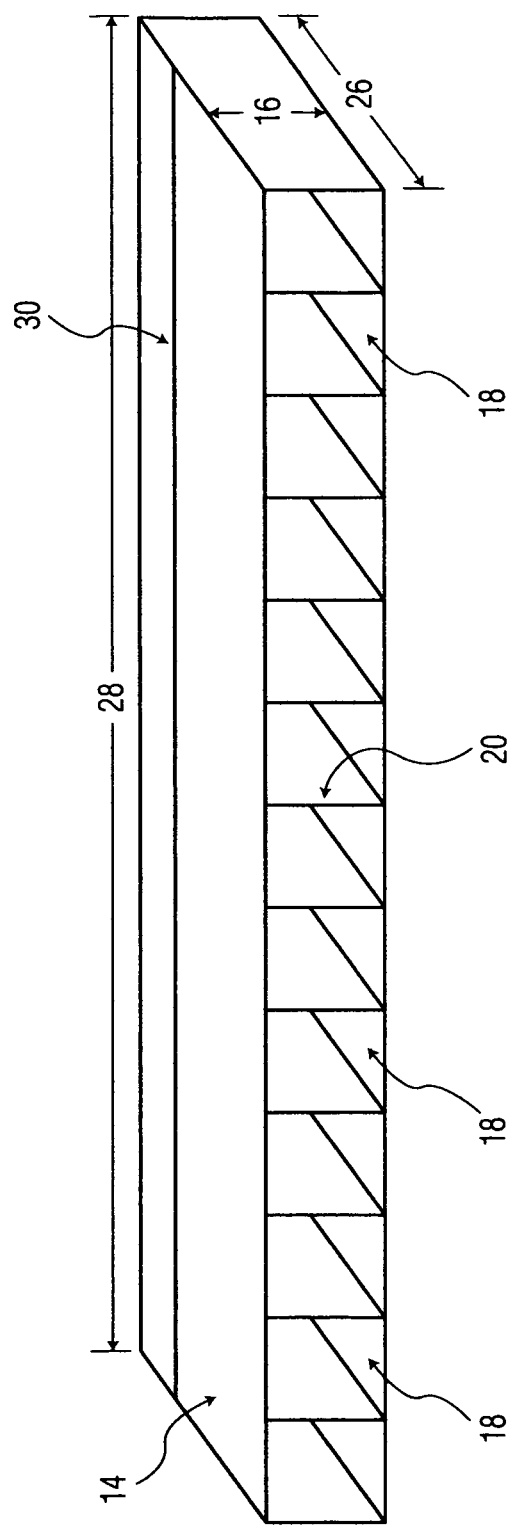
FIG. 2 is a side view of an embodiment of this invention.
Figure 3:
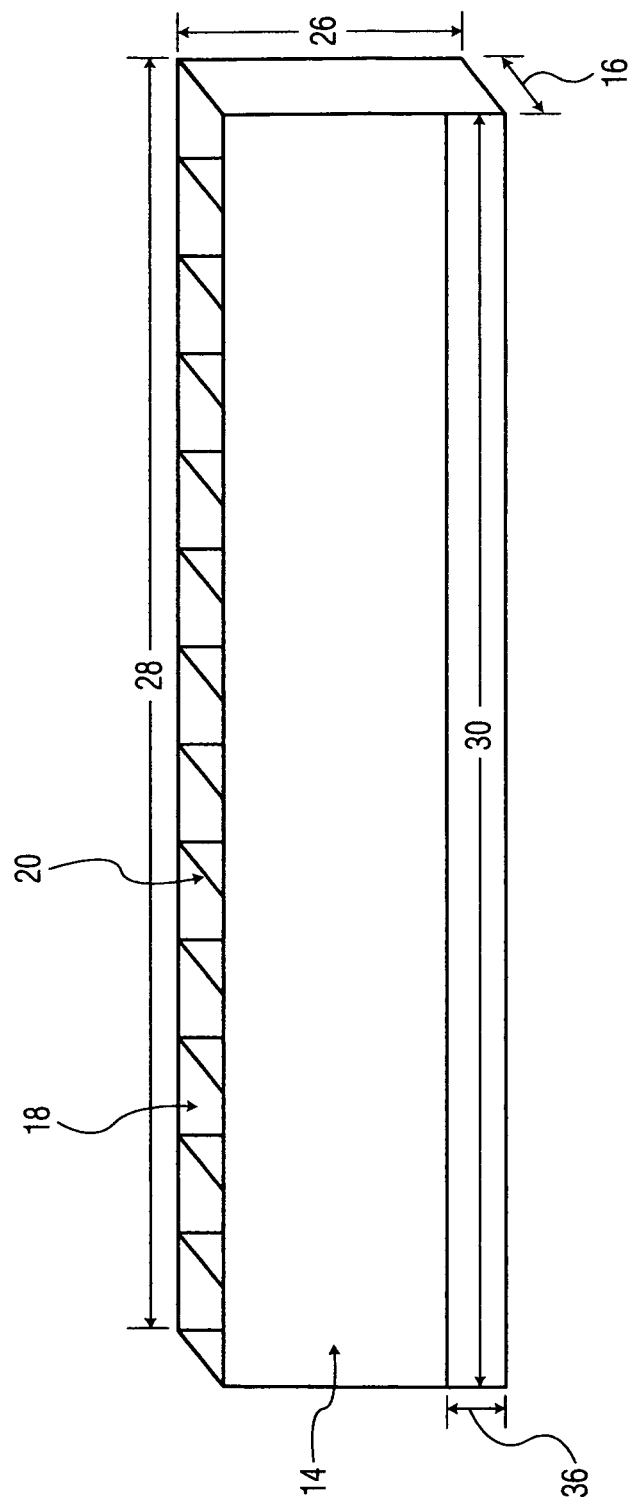
FIG. 3 is bottom view of the embodiment of FIG. 2.
Figure 4:
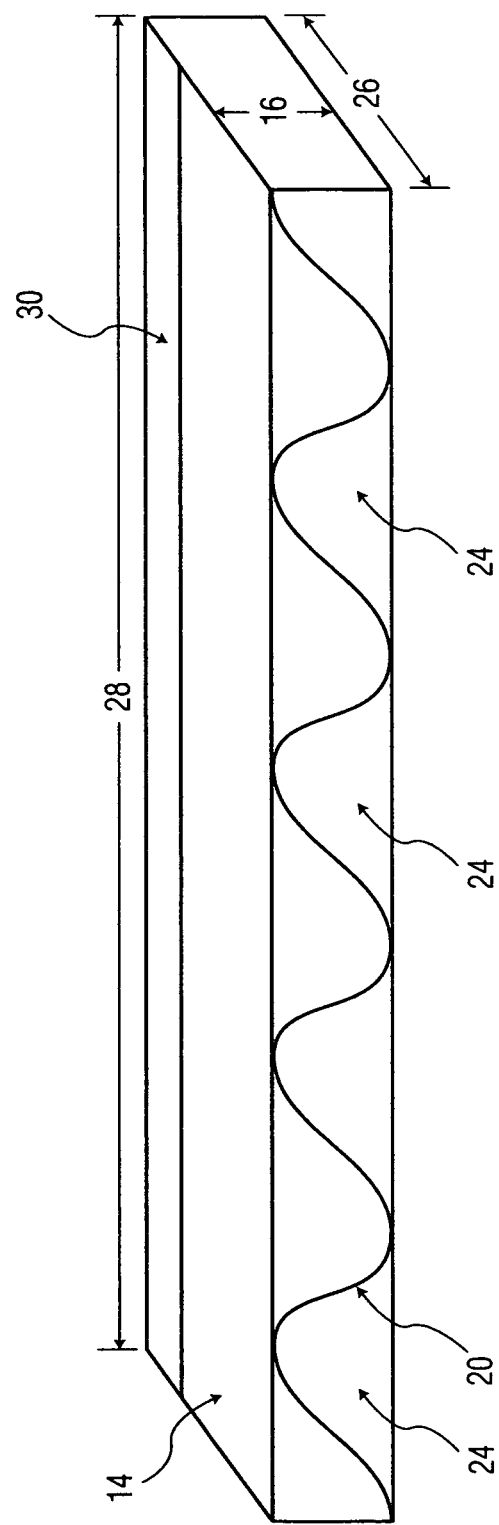
FIG. 4 is a side view of an embodiment of the invention.
Figure 5:
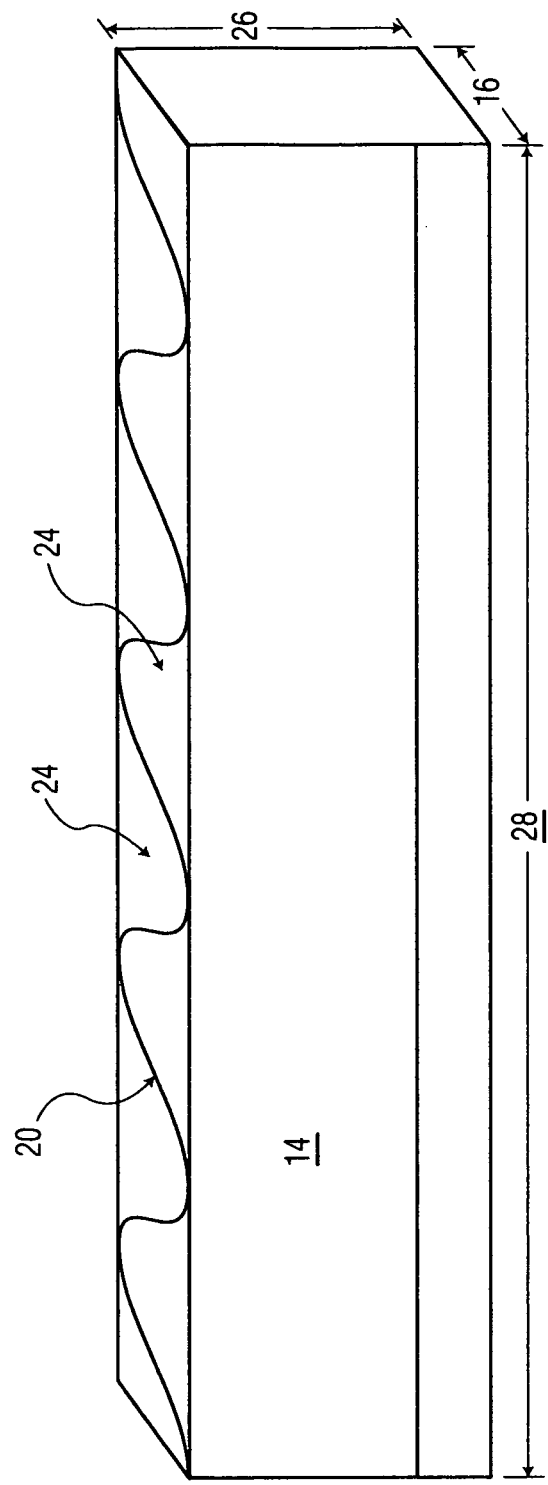
FIG. 5 is a bottom view of the embodiment of FIG. 4.

Connected to the air duct is a first spacer 14, as shown in FIG. 1 as being on the vertical sides and corners of the duct. First spacer 14 is made preferably of a light-weight non heat-conductive material such as stiff paper or cardboard, plastic, Styrofoam, or similar material. Spacer 14 has a thickness 16 that can vary but preferably is a minimum of ⅛ inches up to 1 inch to provide sufficient air space for insulative effect. Contained within spacer 14 are air spaces 18, formed by vertical members 20 (FIG. 2), of the spacer material. First spacer 14 has a width dimension 26 and a length dimension 28. The width dimension can be any desired width, depending on the height and width dimensions of the duct, but preferably ranges from about 3-4 inches up to about 12 inches. As shown in FIG. 2, the air spaces 18 run perpendicular to the length of spacer 14. As also shown in FIGS. 2 and 3, the air space 18 is of a square or rectangular shape. But other shapes are also within the scope of this invention, such as circular or oval air spaces 22, diagonal spaces 35, or "wave" shaped air spaces 24. See FIGS. 4 and 5. Accordingly, the material selected for spacer layer 14 must be rigid in order to prevent the air spaces 18 from being crushed or compressed, either during installation or in actual use. Spacer 14 also comprises an adhesive strip 30 that is affixed lengthwise along an edge of spacer 14, for easy attachment of the spacer 14 to the air duct 12 or to another layer of spacers.

FIG. 1 also illustrates the attachment of spacers 14 to the air duct 12. As shown, spacers 14 are attached lengthwise along the air duct 12 at the sides, or height dimension, of the air duct. Accordingly, the width dimension 26 of spacer 14 is preferably the same as the height of the air duct 12. Spacer 14 is also attached lengthwise to air duct 12 at the top and bottom of the air duct 12, but primarily, only at the corners of the duct. Thus, there is a gap, or air space 32 between first spacers 14 at the top and bottom of the air duct 12. The air spaces 32 can be of any desired width, and largely depends on the width of the air duct 12. In some cases for narrow air ducts, there may not need to be an air space 32 between the spacers 14. Spacers 14 are also attached to air duct 12 such that they overlap the spacers 14 attached to the sides of the air duct 12, as shown by designation 34. Spacers 14 can be attached to air duct 12 by means of the adhesive strip 30, which has a width dimension 36 which may vary from about 1" to 2" or more. Other attachment means such as glue or other adhesive, or screws 40, may be used.

Once a first layer of spacers 14 is attached to air duct 12, the duct/spacer combination can be wrapped with reflective insulation material 37. If additional insulation R value is required, a second spacer 38 may be attached over the first spacers 14. Second spacers 38 have the same construction and design features of spacer 14, and are attached to spacers 14 in the same manner that spacers 14 are attached to air duct 12. When second spacers 38 are added, reflective insulation material 37 becomes optional, meaning that it can be used and the second spacers 38 can be applied over the top of it, or it may be eliminated altogether. In either instance, reflective insulation material 39 is wrapped around the air duct/two spacer layer combination.

It is preferred that the spacers 14 and/or spacers 38 be attached to air duct 12 prior to the installation of the air duct in the building. In addition, the reflective insulation material 37 or 38 may be pre-attached or not, depending on the application.

The preceding preferred embodiments are illustrative of the practice of the invention. It is to be understood, however, that other expedients known to those of skill in the art, or disclosed herein, may be employed without departing from the spirit of the invention or the scope of the claims.

What is claimed is:

1. A system for improving the R value of reflective insulation material used to wrap heating and air conditioning ducts, comprising:
    an air duct;
    a first layer of spacers comprising; a single layer of a plurality of spacer strips comprised of light-weight, non heat-conductive, rigid material, wherein each spacer strip contains air spaces, air pockets or channels, and wherein each of said spacer strips is configured to be adhesively attached longitudinally along a top a bottom a left or right side of said air duct, at least one spacer strip being positioned on each side of said air duct, such that the spacer strips are positioned on each of said sides and top and bottom of said air duct,
    an air space or gap located between each of said spacer strips on said top and said bottom of said air duct,
    whereby said R value of reflective insulation material when wrapped around said first layer of spacers is improved because of said air spaces within said spacer strips and said air spaces or gaps between each of said spacer strips on each of said sides, top and bottom of said air duct.

2. The system of claim 1, wherein said first layer of spacers is attached to the air duct prior to the installation of the air duct in a building.

3. The system of claim 1, wherein said spacer strips further comprise adhesive strips for attaching said spacer strips to the air duct.

4. A system for improving the R value of reflective insulation material used to wrap heating and air conditioning ducts, comprising:
    an air duct;
    a first layer of spacers comprising; a single layer of a plurality of spacer strips comprised of light-weight, non heat-conductive, rigid material, wherein each spacer strip contains air spaces, air pockets or channels, and wherein each of said spacer strips is configured to be adhesively attached longitudinally along a top, a bottom, a left or right side of said air duct, at least one spacer strip being positioned on each side of said air duct, such that the spacer strips are positioned on each of said sides and top and bottom of said air duct,
    an air space or gap located between each of said spacer strips on said top and said bottom of said air duct,
    a first layer of reflective insulation material wrapped around said first layer of spacers;
    a second layer of spacers comprising; a second layer of a plurality of spacer strips comprised of light-weight, non heat-conductive, rigid material, wherein each spacer strip of said second layer contains air spaces, air pockets or channels, and wherein each of said spacer strips of said second layer is configured to be adhesively attached longitudinally to said first layer of reflective insulation material wrapped said air duct along said top, said bottom, and said left or right sides of said air duct, at least one spacer strip being positioned on each side of said air duct, such that the spacer strips of said second layer are positioned on said first layer of reflective insulation material at each of said sides and top and bottom of said air duct,
    whereby said R value of a second layer of reflective insulation material when wrapped around said second layer of spacers is improved because of said air spaces within said spacer strips and said air spaces or gaps between each of said spacer strips on each of said sides, top and bottom of said air duct, of said first and second layers of said spacers.

5. The system of claim 4, wherein said first and second layers of spacers are adhesively attached prior to the installation of said air duct in a building.

6. The system of claim 4, wherein said spacer strips of said second layer of spacers further comprise adhesive strips for attaching said spacer strips of said second layer of spacers to the reflective insulation material wrapped around said first layer of spacers.

* * * * *